United States Patent Office 3,304,226
Patented Feb. 14, 1967

3,304,226
PYRIDYL-PHOSPHORODITHIOIC ACID ESTERS
AND METHODS OF KILLING PESTS
Peter F. Epstein, El Cerrito, and Mervin E. Brokke, Richmond, Calif., assignors to Stauffer Chemical Company, New York, N.Y., a corporation of Delaware
No Drawing. Filed July 10, 1964, Ser. No. 381,927
4 Claims. (Cl. 167—33)

This invention relates to a certain new and novel class of phosphorous containing organic compounds and to the use of same as insecticides and acaricides. The compounds are particularly valuable for their insecticidal and miticidal properties. More specifically, this invention relates to pyridine phosphates of the general formula

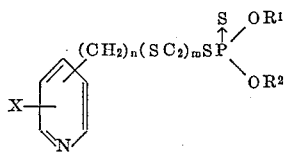

wherein X is selected from the group consisting of hydrogen, lower alkyl and cyano radicals and combinations thereof, $R^1$ and $R^2$ are selected from the group consisting of lower alkyl, lower alkoxyalkyl and lower haloalkyl, $m$ is an integer from 0 to 1, and $n$ is an integer from 0 to 4, inclusive. The invention includes a method of preparation, utility and application of said compounds.

Within the embodiment of the present invention, the pyridine phosphates of the above-mentioned formula, wherein $n$ is the integer 3 and 4, are easily prepared by the method of Example 3 of the following examples using the corresponding ω-(2-pyridyl)-alkane thiol. Examples of compounds that can be prepared are when $n$ is 3, S-[γ-(2-pyridyl)-propylthiomethyl]-O,O-diethyl-phosphorodithioate, and when $n$ is 4, S-[ω-(2-pyridyl)-butylthiomethyl]-O,O-diethyl-phosphorodithioate.

The compounds of the present invention can be made in accordance with the following illustrative examples.

Example 1

S - (3 - cyano - 4,6 - dimethyl - 2 - pyridyl) - O,O-diethylphosphorodithioate.—A mixture of 2-chloro-3-cyano-4,6-dimethyl-pyridine (16.6 parts), potassium O,O-diethyl phosphorodithioate (25 parts), toluene (100 parts) and water (100 parts) was stirred under reflux for 2 hours. The product that was isolated from the toluene layer by evaporation of the solvent was a white solid, M.P. 56–58° C. The yield was 62.2 percent of theory.

Analysis.—Calculated for $C_{12}H_{17}N_2O_2PS_2$: C, 45.56; H, 5.42; N, 8.85; S, 20.27; P, 9.79. Found: C, 45.79; H, 5.37; N, 8.99; S, 20.09; P, 10.01.

Example 2

S - (2 - pyridyl methyl) - O,O - diethyl - phosphorodithioate.—A mixture of 2-picolyl chloride hydrochloride (16.4 parts), ammonium O,O-diethyl phosphorodithioate (60.9 parts) and water (150 ml.) was heated under reflux for 2 hours. Upon basification the product was obtained as a yellow oil, $n_D^{30}=1.5164$. The yield was 75.8 percent of theory.

Analysis.—Calculated for $C_{10}H_{16}NO_2PS_2$: C, 43.31; H, 5.81; N, 5.05; S, 23.12; P, 11.17. Found: C, 43.07; H, 6.00; N, 4.98; S, 23.31; P, 11.28.

Example 3

S - [β - (2 - pyridyl) - ethyl - thiomethyl] - O,O - diethyl-phosphorodithioate.—To a mixture of β-(2-pyridyl)-ethane-thiol (13.9 parts), potassium hydroxide (5.6 parts), ethanol (150 parts) and water (100 parts) was added S-chloromethyl-O,O-diethylphosphorodithioate (23.5 parts). The mixture was heated under reflux for 2 hours. After removal of potassium chloride and the solvent, the product was obtained as a pale brown oil, $n_D^{30}=1.5568$. The yield was 70 percent of theory.

Analysis.—Calculated for $C_{12}H_{20}NO_2PO_3$: C, 42.71; H, 5.97; N, 4.15; S, 28.51; P, 9.18. Found: C, 4.40; H, 5.98; N, 4.12; S, 28.73; P, 8.74.

The following is a table of the compounds prepared according to one of the above described procedures, designated by the example number. Compound numbers have been assigned to each compound and are used throughout the balance of the application.

TABLE I

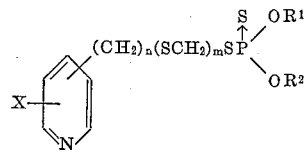

| Cpd. No. | Method of Preparation | X | Position of Phosphate Substitution | $n$ | $m$ | $R_1$ and $R_2$ | M.P. or $n_D^{30}$ |
|---|---|---|---|---|---|---|---|
| 1* | 1 | 3-CN, 4-Me, 6-Me | | 2 | 0 | 0 | $C_2H_5$ | [1] 56–58 |
| 2* | 2 | H, H, H | | 2 | 1 | 0 | $C_2H_5$ | 1.5104 |
| 3* | 3 | H, H, H | | 2 | 2 | 1 | $C_2H_5$ | 1.5568 |
| 4 | 3 | H, H, H | | 3 | 1 | 1 | $C_2H_5$ | 1.5658 |
| 5 | 3 | H, H, H | | 2 | 1 | 1 | $C_2H_5$ | 1.5628 |
| 6 | 3 | H, H, 6-Me | | 2 | 1 | 1 | $C_2H_5$ | 1.5593 |
| 7 | 3 | H, H, H | | 2 | 1 | 1 | $n\text{-}C_3H_7$ | 1.5601 |
| 8 | 3 | H, H, H | | 2 | 2 | 1 | $n\text{-}C_3H_7$ | 1.5499 |
| 9 | 3 | H, H, H | | 4 | 2 | 1 | $C_2H_5$ | 1.5575 |
| 10 | 2 | H, H, H | | 2 | 1 | 0 | $C_2H_4OCH_3$ | 1.5455 |
| 11 | 2 | H, H, H | | 2 | 2 | 0 | $C_2H_4CL$ | 1.5542 |

[1] Degrees centigrade.

*No. 1 prepared in Example 1; No. 2 prepared in Example 2; No. 3 prepared in Example 3.

As previously mentioned, the herein described new compositions produced in the above described manner are biologically active compounds which are useful and valuable in controlling various pest organisms. The compounds of this invention were evaluated in the following tests.

Miticide evaluation test.—The two-spotted mite, Tetranychus telarius (Linn.), was employed in tests for miticidal activity. Young pinto bean plants in the primary leaf stage were used as the host plants. The young pinto bean plants were infested with several hundred mites. Dispersions of candidate materials were prepared by dissolving 0.1 gram in 10 ml. of a suitable solvent, usually acetone. Aliquots of the toxicant solutions were suspended in water containing 0.0175% v./v. Sponto 221®, an emulsifying agent; the amount of water being sufficient to give concentrations of active ingredient ranging from 0.25 to 0.003%. The test suspensions were then sprayed on the infested pinto bean plants. After seven days, mortalities of adult and ovicidal forms were determined. The percentage kill was determined by comparison with control plants which had not been sprayed with the candidates. The LD-50 value was calculated using well known procedures. The LD-50 values for two-spotted mite are reported under the columns post-embryonic (PE) and eggs (E) in Table II below.

Some of the compounds of the present invention exhibited systemic miticidal properties. Particularly, compounds number 3, 5 and 6 were active as systemic acaricides. The compounds were subjected to a test to evaluate the root absorption and upward translocation of the candidate. Again the two-spotted mite was employed in the test for systemic activity. Young pinto bean plans in the primary leaf stage were used as the host plants. The plants were placed in bottles containing 200 ml. of the test solution and held in place with cotton plugs. Only the roots were immersed. The solutions were prepared by dissolving the compounds to be tested in a suitable solvent, usually acetone, and then diluting with distilled water. The final acetone concentration never exceeded 1%. The toxicants were initially tested at a concentration of 10 parts per million (p.p.m.). Immediately after the plants were placed in the test solutions they were infested with mites. Mortalities were determined after seven days. The percentage of kill was determined by comparison with control plants which had been placed in distilled water only. The LD-50 value in p.p.m. were calculated and reported: compound number 3, 0.5 p.p.m., number 5, 0.75 p.p.m., and number 6, 3 p.p.m.

*Insecticidal evaluation test.*—Three insect species were subjected to evaluation tests for insecticides incorporating the compounds of the present invention.

(1) Housefly—*Musca domestica* (Linn.)—designated HF.
(2) American cockroach—*Periplaneta americana* (Linn.)—designated AR.
(3) Spotted milkweed bug—*Oncopeltus fasciatus* (Dallas)—designated MWB.

The procedure for the insects was similar to the acaricidal testing procedures. Test insects were caged in cardboard mailing tubes 3⅛" in diameter and 2⅝" tall. The mailing tubes were supplied with cellophane bottoms and coarse mesh nylon tops. Each cage was provided with food and water. From ten to twenty-five insects were employed per cage. The caged insects were sprayed with the active candidate compound at various concentrations. Final mortality readings were taken after seventy-two hours.

The housefly evaluating tests differed in the following manner. The toxicant was dissolved in a volatile solvent, preferably acetone; the active compound was pipetted into a petri dish bottom, allowed to air dry and placed in a cardboard mailing tube. Twenty-five female flies, three to five days old, were caged in the tube. The flies were continuously exposed to the known residue of the active compound in the cage. After twenty-four and forty-eight hours counts were made to determine living and dead insects. The LD-50 values were calculated using well-known procedures. The following results were obtained.

TABLE II

| Compound Number | Insecticidal Activity | | | Acaricidal Activity | |
|---|---|---|---|---|---|
| | HF, μg. | AR, percent | MWB | PE | E |
| 1 | 10 | 0.01 | | 0.1 | |
| 2 | 100 | 0.05 | | 0.05 | |
| 3 | 30 | 0.10 | 0.03 | 0.005 | 0.005 |
| 4 | | | 0.03 | 0.01 | 0.03 |
| 5 | 75 | 0.10 | 0.008 | 0.01 | 0.1 |
| 6 | 30 | 0.05 | 0.03 | 0.01 | 0.005 |
| 7 | 10 | | | 0.003 | 0.005 |
| 8 | 50 | | | 0.005 | 0.03 |
| 9 | 100 | | | 0.01 | 0.03 |
| 10 | 100 | | | 0.1 | |
| 11 | 100 | | | 0.1 | |

From these data it can be seen that these new compounds are valuable insecticides and acaricides. They may also be used in the form of emulsions, non-aqueous solutions, wettable powders, vapors, dusts, and the like, as may be best fitted to the particular utility. The application to a pest habitat of the compounds of the present invention are well known to those skilled in the art.

Various changes and modifications may be made without departing from the spirit and scope of the invention described herein as will be apparent to those skilled in the art to which it pertains. It is accordingly intended that the present invention shall only be limited by the scope of the appended claims.

We claim:

1. The method of killing pests selected from the group consisting of insects and acarids comprising applying to said pest habitat an effective amount of a compound of the formula

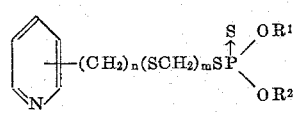

wherein $R^1$ and $R^2$ are lower alkoxy alkyl, $m$ is an integer from 0 to 1 and $n$ is an integer from 0 to 4, inclusive.

2. The method of killing pests selected from the group consisting of insects and acarids comprising applying to said pest habitat an effective amount of O,O-bis(β-methoxyethyl)-S-(2-pyridylmethyl)-phosphorodithioate.

3. Compound of the formula

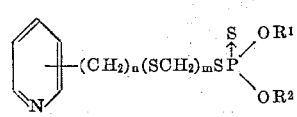

wherein $R^1$ and $R^2$ are lower alkoxy alkyl, $m$ is an integer from 0 to 1 and $n$ is an integer from 0 to 4, inclusive.

4. The compound, O,O - bis($\beta$ - methoxyethyl) - S-(2-pyridylmethyl)-phosphorodithioate.

References Cited by the Examiner

UNITED STATES PATENTS

| 2,862,019 | 11/1958 | Schrader | 260—294.8 XR |
| 2,961,445 | 11/1960 | Saul | 260—294.8 |
| 3,041,367 | 6/1962 | Leber et al. | 260—294.8 XR |

FOREIGN PATENTS

| 199,000 | 8/1958 | Austria. |
| 713,278 | 8/1954 | Great Britain. |
| 13,079 | 7/1963 | Japan. |

JULIAN S. LEVITT, *Primary Examiner.*

VERA C. CLARKE, *Assistant Examiner.*